Jan. 25, 1966 J. N. REID 3,231,829

SYNC LOCK PHASE CONTROL

Filed April 23, 1963 2 Sheets-Sheet 1

INVENTOR
JOHN N. REID

BY Smart & Biggar
ATTORNEYS.

INVENTOR
JOHN N. REID
BY Smart & Biggar
ATTORNEYS.

United States Patent Office 3,231,829
Patented Jan. 25, 1966

3,231,829
SYNC LOCK PHASE CONTROL

John N. Reid, Almonte, Ontario, Canada, assignor to Northern Electric Company Limited, Montreal, Quebec, Canada Filed Apr. 23, 1963, Ser. No. 275,082
7 Claims. (Cl. 331—20)

Figure 1:
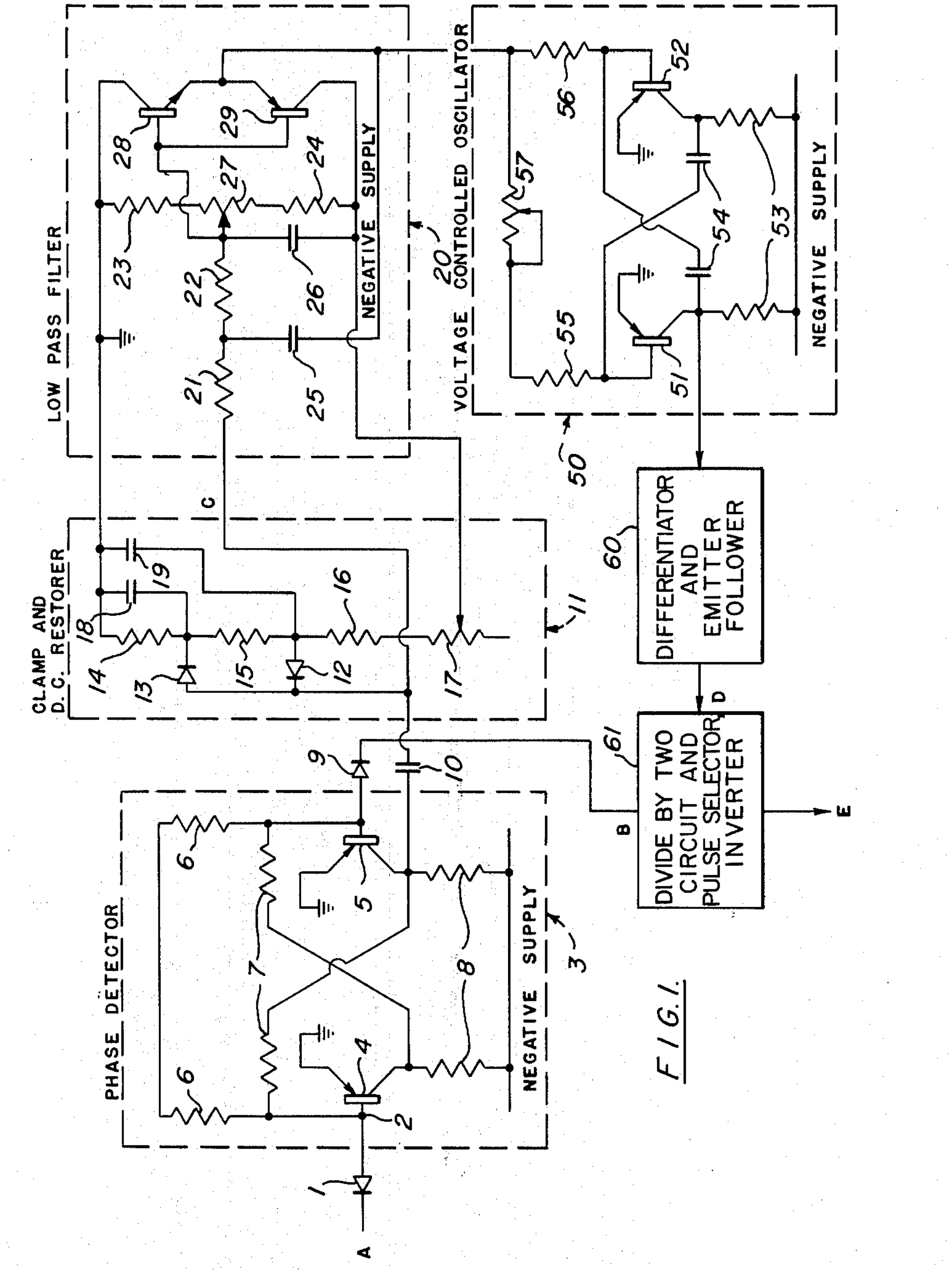

This invention relates to a device for controlling the phase relationship between a received sync signal which is to be re-formed, and a locally generated sync signal. While the design and operation of apparatus made in accordance with the invention is herein described in connection with a television system, it will be apparent to persons skilled in the art that the principles of the invention are of general use in sync generator circuitry.

In the transmission of compound signals containing different types of information, such as for example a composite television signal, it is often desirable to be able to reconstitute at least part of the information therein contained prior to re-broadcasting. This is particularly the case in connection with "live" broadcasts of television programs which do not originate with a local station, but which are received by it in the form of a composite video signal which contains picture or video information together with blanking and synchronizing information. As a result of transmission over long distances, the composite signal becomes distorted and it is accordingly desirable to reshape the sync signal portion of the composite video wave form. Since the sync information is larger in amplitude than the video and blanking information it is possible to reshape the sync pulses by a method which involves "clipping" or "stripping" the incoming sync pulses from the received composite wave form. These stripped pulses are then used to control the frequency of oscillation of a generator located at the local station, whose output is then combined with the incoming video information to form an improved signal suitable for re-transmission. Apart from the obvious requirement that the output of the local sync oscillator be phase locked to the received sync signals, it is also desirable to be able to control the phase relationships therebetween. This is so because the locally generated sync pulses, which are to be combined with the received video and blanking information, have a precise relative time relation commonly referred to as "front porch width" (namely, 1.27 microseconds) i.e. the time lag between the leading edge of a horizontal sync pulse and the leading edge of a horizontal blanking pulse. Since there is delay involved during transmission and differing standards for the "front porch width" it is desirable to have some method of adjusting the phase or time relation between the locally generated sync signals and the sync signal portion of the received composite video wave form.

Apparatus for effecting this type of reshaping of the synchronization pulses of a composite signal has been known for some time, but with these prior designs it is not possible effectively to control the phase relationship between the received sync signals which are stripped from the composite wave form, and the locally generated sync signals which are combined with the incoming video information, in a manner which will not cause appreciable disturbance to the "free running" or centre frequency of the local oscillator when for some reason or another, such as atmospheric conditions, the incoming received sync signal fails.

It is accordingly an object of this invention to provide an arrangement permitting close control over the phase relationship between a received series of synchronization pulses, and locally generated pulses which are in fact to be "substituted" for them in a reconstituted composite signal, by means which will avoid observable disturbance to the synchronization of television receivers tuned to the local station if and when there is some failure in the reception by the local station of the information received from the remote station.

I have found that it is possible to provide a device which permits close adjustment of the relative phase between received and locally generated sync signals of frequency $f$ by providing apparatus which includes a phase detector which has two inputs, the first of which is connected to the received signal and the second to a signal derived from locally generated pulses. The output of the phase detector, the voltage of which is substantially proportional to the difference in phase between the signals applied to the two inputs, is by a capacitor coupling means fed to the input of a D.C. restorer circuit which includes means for rectifying the rectangular wave output of the phase detector so as to impose a D.C. potential thereon and maintain one extremely of the swing of said output wave at a given D.C. potential. The output of the D.C. restorer is then fed through a low pass filter and used to control the frequency of a local oscillator which has a nominal centre frequency $nf$, wherein $n$ is a positive even integer. The output of the oscillator is then fed to a divide by $n$ frequency divider-pulse selector circuit which provides two series of output pulses each of frequency $f$. The first series consists of every $n$th pulse which occur at approximately the same time as the received pulse and which are used for deriving all time relationships within the remaining parts of the sync generator apparatus. The other series of output pulses, comprising each $n$th pulse which occurs midway between the pulses of the first-mentioned series (and therefore at approximately the same time as the received pulses) is applied to the second input of the phase detector. The feed-back loop thus provided affords, through the control of the amount of D.C. component imparted by the restorer circuit, a means of adjusting the phase between the received and locally generated sync signals which means, however, do not disturb the operation of the local oscillator should the received signal fail due to poor reception or any other reason.

Figure 2:
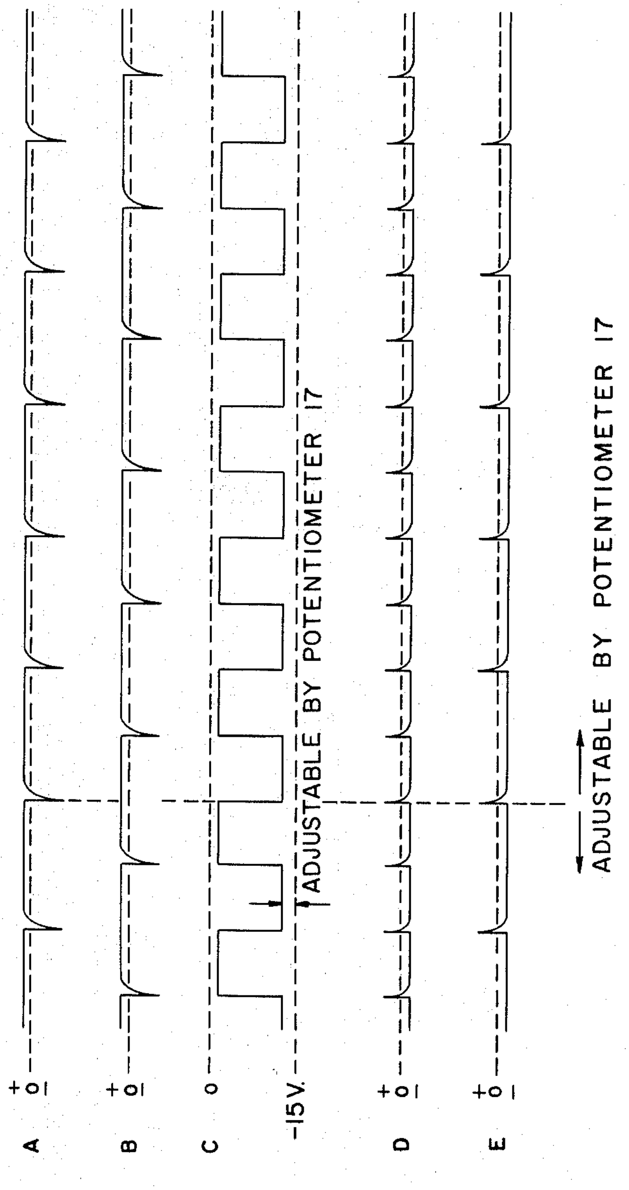

The invention will now be described with respect to the following figures of drawings in which:

FIGURE 1 shows a circuit, in partly schematic and partly diagrammatic form, illustrative of one embodiment of the invention; and FIGURE 2 illustrates the wave forms, and the relationships therebetween, of the signals present at selected parts of the circuit shown in FIGURE 1.

Referring now to the figures a 15.75 kc./s. pulse train A (see FIGURE 2) is by well-known means derived from the "stripped" sync of the incoming or received composite wave form and is applied through diode 1 to one input 2 of a bistable multi-vibrator generally indicated at 3 which is used as a phase detector. The bistable multivibrator is of conventional design, involving PNP transistors 4 and 5 and pairs of resistors 6, 7 and 8 connected as shown. The other input to the phase detector circuit is derived from the local oscillator generally indicated at 50 (and which will be referred to in more detail below) and is at B applied through the diode 9 to the base of the transistor 5. The phase relationship between the inputs A and B determine the duty cycle of the flip-flop and hence the average voltage at the collector output.

This output of the phase detector is then fed by an A.C. coupling comprising the condenser 10 to a D.C. restorer or "clamp" circuit generally indicated at 11 which is also per se known and comprises diodes 12 and 13, fixed resistors 14, 15 and 16, variable resistor 17 and condensers 18 and 19 connected as shown. The wave form at the output of this D.C. restorer circuit, indicated as at C, comprises a rectangular wave having a variable amount of D.C. component, the variable resistor 17 permitting of adjustment of the "clamping level" as indicated in connection with the wave form diagram C of FIGURE 2 whereby one extremity of the swing of the rectangular wave is maintained at a given D.C. potential as shown by the arrows. This output C is then connected to a second order low pass active filter generally indicated at 20 which is used to detect its average value. As shown in FIGURE 1, this filter which is of per se conventional design comprises resistors 21, 22, 23 and 24, condensers 25 and 26, potentiometer 27, NPN transistor 28 and PNP transistor 29, connected as shown. This filter, of course, serves to attenuate the pulse frequency component of the signal C at the output of the D.C. restorer circuit 11. The potentiometer 27 in the filter circuit is used to bias the output of the filter to a nominal value of half the collector supply voltage, which value is equal to the average value of the waveform C from the flip-flop phase detector 3 when its duty cycle is 0.5.

The output of the filter 20 is then applied to control the frequency of oscillation of a voltage controlled oscillator, generally indicated at 50, the circuit of which is also in itself conventional. As shown it comprises PNP transistors 51 and 52, pairs of resistors and condensers 53 and 54 repectively, resistors 55 and 56 and variable resistor 57, which permits adjustment of the nominal frequency of the oscillator, which in this particular application is 31.5 kc./s., i.e. twice the frequency of the received signal A. In general the "centre" or "free running" frequency of the voltage controlled oscillator 50 will be an even-numbered multiple $n$ times the frequency of the received signal, i.e. $n=2$ or 4 or 6 . . . etc. In the particular example here shown $n=2$.

The output of the oscillator 50, taken from the collector of the transistor 51 is then fed into a differentiator circuit having an emitter follower at its output, generally indicated at 60, both of known design, yielding a waveform D as illustrated in FIGURE 2 from which the locally generated sync pulses are derived. The waveform D is in turn fed into a "divide by two"-pulse selector circuit of conventional form (see "Pulse and Digital Circuits" Millman and Taub, first edition, 1956, McGraw Hill, New York, pages 323 and 363 for frequency dividers, and page 397 for a pulse selecting or coincidence circuit) which yields two series of pulse outputs. The first comprises a waveform E (see FIGURE 2) consisting of a 15.75 kc./s. pulse train the pulses of which occur at approximately the same time as the received pulses A from which new horizontal sync pulses are derived in the remaining parts of the sync generator apparatus not shown in FIGURE 1. The pulse selector also produces a second series of output pulses comprising a 15.75 kc./s. pulse train which is formed from the alternate pulses of D so that each of these pulses occur midway between the pulses of the first series. Thus if D is considered to be a series of pulses numbered $p-3$, $p-2$, $p-1$, $p$, $p+1$, $p+2$, etc. then E (the first output) is formed from the pulses $p-3$, $p-1$, $p+1$, $p+3$, etc., and the second output is formed from the pulses $p-2$, $p$, $p+2$, $p+4$, etc. This second output is then, in the particular embodiment of the invention here shown, inverted and applied as waveform B to the second input of the flip-flop phase detector 3, through the diode 9 as discussed above. There is thus formed a closed loop path comprising the flip-flop phase detector 3, the D.C. restorer 11, the filter 20, the voltage controlled oscillator 50, the differentiator and emitter follower 60, the divide by two and pulse selector circuits 61, and the inverter which allows the frequency and phase of the voltage controlled oscillator 50 (and thus waveforms D, B and E) to be locked to the incoming or received sync waveform A.

In operation the behaviour of the circuit is as follows. When the incoming signal A exists, and the voltage controlled oscillator 50 is locked to it, the controls 17, 27 and 57, all of which are variable resistors, will all to some extent permit a relative phase adjustment; however, the variable resistor 17 in the D.C. restorer circuit is the only control which should be used for this purpose. Under conditions where the incoming signal does not exist, such as during a transmission failure, variable resistors 27 and 57 will control the frequency of the oscillator 50 and the variable resistor 17 will have no effect. Variable resistor 57, however, is the only control which should be used for adjusting the free running frequency of the oscillator 50. The potentiometer 27 in the filter 20 should be regarded only as a "coarse" phase adjustment when the phase-lock loop is closed; its purpose is to place the fine-phase adjustment range covered by the variable resistor 17 within the correct limits. Under operating conditions, therefore, the variable resistor 57 of the voltage controlled oscillator permits free running frequency adjustment, the potentiometer 27 of the filter 20 permits coarse-phase adjustment, and the variable resistor 17 of the D.C. restorer permits fine-phase control.

It will be apparent that the circuit described makes possible relative phase adjustment when the loop is closed (i.e. when an incoming signal exists) yet the means permitting such adjustment does not affect the free running frequency of the oscillator 50 when the loop is opened (i.e. when the incoming signal does not exist). It is accordingly possible through this circuit to insure that the free running frequency of the local oscillator is not disturbed when the incoming sync signal fails, and at the same time permit phase adjustment between the two sync signals as required.

In the particular embodiment of the invention described the frequency of the voltage controlled oscillator 50 was twice that of the frequency of the received sync signal. It will, however, be appreciated that in general the frequency of the oscillator 50 may be $nf$, wherein $n=2$ or 4 or 6 . . . etc. In such circumstances the frequency divider-pulse selector circuit 61 divides the frequency by $n$ and yields two series of output pulses each of frequency $f$. Moreover, with the specific circuitry shown in FIGURE 1, satisfactory operation rendered desirable the interposition of a differentiator and emitter follower circuit 60 between the output of the voltage controlled oscillator 50 and the divide by two-pulse selector circuit 61. Similarly the polarity of the second series of output pulses from the circuit 61, and the particular arrangement used for the phase detector, required inversion of the second series of pulses before application thereof to the second input of the phase detector. It will, however, be appreciated by persons skilled in the art that these characteristics of the circuit described were dictated by the details of the individual circuits used and would not necessarily be required in all embodiments of the invention.

In one particular embodiment of the invention having circuitry of the kind illustrated in FIGURE 1, the values of the various components therein shown are as follows:

| | |
|---|---|
| Resistors: | |
| 6 | 150K |
| 7 | 47K |
| 8 | 3.3K |
| 14 | 2K |
| 15 | 12K |
| 16 | 680 |
| 21 | 12K |
| 22 | 22K |
| 23, 24 | 36K |
| 53 | 470 |
| 55 | 820 |
| 56 | 4.7K |
| Variable Resistors: | |
| 17 | 2.5K |
| 27 | 25K |
| 57 | 10K |

Condensers:

| | | |
|---|---|---|
| 10, 25, 26 | mfd | .047 |
| 18, 19 | mfd | 25 |
| 54 | mfd | .0047 |

Transistors:

| | |
|---|---|
| 4, 5, 51, 52 | 2N644 |
| 28 | 2N1051 |
| 29 | 2N1131 |

Diodes:

| | |
|---|---|
| 1, 9, 12, 13 | 1N96 |

What I claim as my invention is:

1. A device for controlling phase relationships between a received sync signal of pulses of frequency $f$ and a locally generated sync signal of the same frequency to be used for deriving time relationships within sync generator apparatus comprising: a phase detector circuit having a first input connected to said received sync signal and a second input connected to said locally generated sync signal and yielding a substantially rectangular wave output whose average voltage is proportional to the difference in phase between said sync signals; a D.C. restorer circuit capacitor coupled to the output of said phase detector, said restorer circuit including means for rectifying said rectangular wave output so as to impose a D.C. potential thereon and maintain one extremity of the swing of said output valve at a given D.C. potential; a low pass filter means coupling the output of said restorer to a voltage controlled oscillator, so as to provide control over the frequency of the same, said voltage controlled oscillator having a nominal centre frequency $nf$, wherein $n$ is a positive event integer; means connecting the output of said oscillator to a divided by $n$ frequency divider-pulse selector circuit yielding two series of output pulses of frequency $f$, the first series consisting of every $n$th pulse which occurs at approximately the same time as the received pulses and the second series comprising every $n$th pulse which occurs midway between the pulses of the first series; means connecting said first series of pulses to the remaining parts of said sync generator apparatus for controlling time relationships therein; and further means connecting said second series of pulses to said second input of the phase detector.

2. A device as claimed in claim 1 where $n=2$.

3. A device as claimed in claim 1 wherein a differentiator circuit is interposed between the output of the voltage controlled oscillator and the divide by $n$ frequency divider-pulse selector circuit.

4. A device as claimed in claim 1 including means for inverting the second series of pulses before they are applied to the second input of the phase detector.

5. A device for controlling the phase relationship between received and locally generated sync pulse signals of frequency $f$ to be used for deriving time relationships within a sync generator apparatus, comprising: a phase detector having a first input connected to said received signal and a second input connected to said locally generated signal and providing an out-put voltage substantially proportional to the difference in phase therebetween; a D.C. restorer circuit capacitor coupled to the output of said phase detector, said restorer circuit including means for rectifying said rectangular wave output so as to impose a D.C. potential thereon and maintain one extremity of the swing of said output valve at a given D.C. potential; low pass filter means connecting the output of said D.C. restorer to a voltage controlled oscillator so as to control frequency of the same, said oscillator having a nominal centre frequency of $nf$, $n$ being a positive even integer; means connecting the output of said oscillator to a divide by $n$ frequency divider-pulse selector circuit adapted to provide first and second series of output pulses, each of frequency $f$; said first series consistnig of every $n$th pulse which occurs at approximately the same time as the pulses of the received signal; said second series comprising every $n$th pulse which occurs midway between pulses of said first series; means whereby said first series is used for controlling time relationships within the sync generator apparatus; and further means whereby said second series of pulses is applied to the second input of the phase detector.

6. A device as claimed in claim 5 wherein $n=2$.

7. A device for controlling the phase relationships between a received sync signal consisting of pulses of frequency $f$ and a locally generated sync signal of the same frequency to be used for deriving time relationships within a sync generator apparatus, comprising: a phase detector having first and second inputs, said first input being connected to said received signal and said phase detector providing an output voltage substantially proportional to the difference in phase between said inputs; a D.C. restorer circuit capacitor coupled to the output of said phase detector, said restorer circuit including means for rectifying said rectangular wave output so as to impose a D.C. potential thereon and maintain one extremity of the swing of said output valve at a given D.C. potential; low pass filter means coupling the output of said D.C. restorer to a voltage controlled oscillator so as to control frequency of the same, said oscillator having a nominal centre frequency $2f$; means including a differentiator circuit coupling the output of said oscillator to a divide by two-pulse selector adapted to yield first and second series of output pulses, each of frequency $f$, said first series comprising every second pulse from the output of said oscillator each of which occurs at approximately the same time as the pulses of said the received signal and said second series comprising the alternate pulses from the output of said oscillator each of which occurs midway between pulses of the first series; means coupling said first series to the remaining parts of said sync generator apparatus so as to control time relationships therein; and a further means, including an inverter circuit, coupling said second series of pulses to the second input of said phase detector.

References Cited by the Examiner

UNITED STATES PATENTS

| | | | |
|---|---|---|---|
| 2,774,872 | 12/1956 | Howson | 331—27 |
| 2,963,648 | 12/1960 | Baskin et al. | |
| 3,006,995 | 10/1961 | Fathauer | 178—69.5 X |
| 3,010,073 | 11/1961 | Melas | 178—69.5 X |

FOREIGN PATENTS

| | | |
|---|---|---|
| 839,422 | 6/1960 | Great Britain. |

ROY LAKE, *Primary Examiner.*

JOHN KOMINSKI, *Examiner.*